United States Patent
Silver et al.

(10) Patent No.: US 6,876,970 B1
(45) Date of Patent: Apr. 5, 2005

(54) VOICE-ACTIVATED TUNING OF BROADCAST CHANNELS

(75) Inventors: Edward Michael Silver, Atlanta, GA (US); Linda Ann Roberts, Decatur, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 703 days.

(21) Appl. No.: 09/879,219

(22) Filed: Jun. 13, 2001

(51) Int. Cl.[7] .......................... G10L 15/22; G06F 13/10
(52) U.S. Cl. .......................... 704/275; 704/270; 725/38
(58) Field of Search ................ 704/270, 273, 704/275; 725/38, 39; 382/115

(56) References Cited

U.S. PATENT DOCUMENTS

| | | | |
|---|---|---|---|
| 5,585,865 A | | 12/1996 | Amano et al. |
| 5,734,444 A | | 3/1998 | Yoshinobu |
| 5,774,859 A | * | 6/1998 | Houser et al. ............. 704/275 |
| 5,777,571 A | | 7/1998 | Chuang |
| 5,945,988 A | | 8/1999 | Williams et al. |
| 6,119,088 A | | 9/2000 | Ciluffo |
| 6,128,009 A | | 10/2000 | Ohkura et al. |
| 6,654,721 B2 | * | 11/2003 | Handelman ............. 704/270 |

* cited by examiner

*Primary Examiner*—Abul K. Azad
(74) *Attorney, Agent, or Firm*—Merchant & Gould

(57) ABSTRACT

A method for voice-activated tuning of broadcast programs. A system architecture of an embodiment of the present invention comprises a microphone, a signal converter, a digital signal processor (DSP), a memory, a tuner, and an output device. A method for implementing an embodiment of the present invention comprises the following steps. First, the relationships between voice commands and channels are created. The relationships are preferably stored in the memory. Second, when a speech segment (comprising one or more words) is spoken by a user, the speech segment is captured by the microphone. Third, the microphone transforms the speech segment into an analog signal. Fourth, the signal converter converts the analog signal to a digital signal. Fifth, the DSP receives the digital signal and determines whether the speech segments matches one of the voice commands. Sixth, if the speech segment is determined to comprise a voice command, the DSP instructs the tuner to tune in to the channel or channels that have been previously associated with the voice command.

21 Claims, 5 Drawing Sheets

VOICE-ACTIVATED TUNING OF BROADCAST CHANNELS

BACKGROUND

Field of the Invention

The present invention relates generally to entertainment systems, and more particularly, to a system and method that enables voice-activated tuning of broadcast channels.

BACKGROUND OF THE INVENTION

Radios and television sets are being used to receive wireless or cable broadcast programming. A tuner or a similar device on the radios and television sets is used to receive a program being broadcast on a channel. For discussion purposes, radios, television sets, and similar electrical apparatus or electronic devices having a tuner are collectively referred to hereinafter as broadcast programming receivers.

In a country such as the United States, there are hundreds of broadcast channels, each of which can be accessible to various broadcast programming receivers. To receive a specific program on a specific channel, the tuner of a broadcast programming receiver is used to adjust the receiving frequency. The tuner can be operated by a user of the receiver through a controller (such as a rotating knob, a dialer, a keypad, and the like). The controller can be an integral component of the receiver. More commonly, however, the controller is a remote control unit that can communicate with the receiver using infrared, RF, or other wireless technologies.

Efforts have been made to incorporate voice recognition capabilities in the receivers. For example, U.S. Pat. No. 5,777,571 issued to Chuang ("The Chuang patent") on Jul. 7, 1998, discloses a remote control device that has voice recognition and user ID restriction functions for the operation of a receiver. The Chuang invention has a voice training mode during which signal characteristics of an authorized user are stored in a memory. The invention further comprises an instruction execution mode during which a voice command received from a user is compared to the voice command previously stored in the memory. If it is determined that the voice command is received from the authorized user, an output control device of the invention outputs a corresponding control signal. The Chuang patent is incorporated herein by reference in its entirety.

In addition, U.S. Pat. No. 6,119,088 issued to Ciluffo ("The Ciluffo patent") on Sep. 12, 2000, discloses a programmer having a voice recognition capability for control of various appliances. The Ciluffo programmer can be adapted to recognize only one voice to enable a parent to prevent a child from using the programmer. In addition, the programmer can be adapted to accept different sets of instructions from different individuals and operate an apparatus based on a hierarchy of the different individuals if voice commands are received from more than one user. The Ciluffo patent is incorporated herein by reference in its entirety.

U.S. Pat. No. 5,585,865 issued to Amano et al. ("The Amano patent") on Dec. 17, 1996, discloses a "television broadcast receiver which selects programs by genre and past viewing habits." When an Amano receiver receives a genre code from a user, the receiver tunes in the channel that has a past record of highest frequency of reception among all channels that are associated with the genre code. The Amano patent is incorporated herein by reference in its entirety.

U.S. Pat. No. 5,734,444 issued to Yoshinobu ("The Yoshinobu patent") on May 31, 1998, discloses a "broadcast receiving apparatus that automatically records frequency watched programs." The Yoshinobu apparatus automatically records a user's frequently tuned in programming when the user is not watching the programming at the day and time when the user is expected to tune in to the channel. The Yoshinobu patent is incorporated herein by reference in its entirety.

U.S. Pat. No. 5,945,988 issued to Williams et al. ("The Williams patent") on Aug. 31, 1999, discloses a "method and apparatus for automatically determining and dynamically updating user preferences in an entertainment system." The Williams invention monitors a user's interaction with an entertainment system. Based on the interaction, the invention can automatically determine which of a plurality of users is currently using the entertainment system. The Williams patent is incorporated herein by reference in its entirety.

U.S. Pat. No. 6,128,009 issued to Ohkura et al. ("The Ohkura patent") on Oct. 3, 2000, discloses a "Program guide controller." In this invention, programs of high viewing frequency of a user are automatically registered, permitting registered programs to be included in genre information. The Ohkura patent is incorporated herein by reference in its entirety.

SUMMARY OF THE INVENTION

The present invention is a system and method that enables a user to use his or her voice to operate a tuner of a broadcast programming receiver. A system of the present invention can be adapted to operate based on voice commands that are speaker-dependent (i.e., the voice commands must be spoken by specific persons) or those that are speaker-independent (i.e., the voice commands can be spoken by any person). Accordingly, in one embodiment of the present invention, the system can be operated by spoken words of one or more authorized users whose voices have been used to create speaker-dependent voice commands, to the exclusion of the voices of other persons. In another embodiment, the system recognizes voice commands spoken by any person. In still another embodiment, the system can operate using both speaker-dependent and speaker-independent voice commands.

A voice command, regardless of whether it is speaker-dependent or speaker-independent, can comprise one or more words. For example, the voice command can comprise a channel or station identifier. The identifier can be one of several variations. Examples of the identifier include call letters (e.g., "WZZZ" and "KYY"), station names (e.g., "Fox 5" and "CNN"), frequencies (e.g., "FM 107.9" and "AM 1200"), and unique, personal identifiers (e.g., "John's favorite sports channel" and "Jane's favorite classical music station"). The voice command instructs the tuner of the receiver to tune in to a specific channel that has been associated with the voice command.

The voice command can also comprise a genre. The genre can be one of several categories of programs. For example, in the context of television broadcasting, one genre may be "Sports," and another genre may be "News." In the context of radio broadcasting, a first genre may be, for example, "country music," and a second genre may be, for example, "talk radio." Each genre comprises one or more channels or stations having the same theme or the same type of programming. If a voice command comprises a genre, the voice command is interpreted by the processor to "surf," "scan,"

or "browse" all the channels associated with the genre, unless the user otherwise interrupts. For example, if a "Sports" genre comprises five sports channels, the tuner tunes in to each of the five sports channels when a voice command comprises "Sports" is received. In one specific embodiment, a channel associated with the genre can be tuned in for a specific amount of time, e.g., from about one second to about 30 seconds, before another channel is tuned in. The tuner can continuously and alternatively tuning in to all the channels of the genre unless another voice command is received.

A system architecture of an embodiment of the present invention comprises a microphone, a signal converter, a digital signal processor (DSP), a memory, a tuner, and an output device. A method for implementing an embodiment of the present invention comprises the following steps. First, the relationships between voice commands and channels are created. The relationships are preferably stored in the memory. Second, when a speech segment (comprising one or more words) is spoken by a user, the speech segment is captured by the microphone. Third, the microphone transforms the speech segment into an analog signal. Fourth, the signal converter converts the analog signal to a digital signal. Fifth, the DSP receives the digital signal and determines whether the speech segment matches one of the voice commands. Sixth, if the speech segment is determined to comprise a voice command, the DSP instructs the tuner to tune in to the channel or channels that have been previously associated with the voice command.

In one aspect of the present invention, a user can associate one or more voice commands with one or more channels by programming the receiver herself. In this aspect of the invention, the voice commands are preferably speaker-dependent. In another aspect of the present invention, a manufacturer of the receiver can preload speaker-independent voice commands in the receiver. In still another aspect of the invention, a user can modify some or all voice commands previously created by a manufacturer of the receiver.

In one specific implementation of the present invention in which a radio of a vehicle is a receiver of the present invention, convenience and safety to occupants of the vehicle can be substantially increased. In such implementation, a driver of the vehicle can safely tune the radio with his or her voice while keeping both hands on the steering wheel and eyes on the road.

In another specific implementation of the present invention in which a television set is a receiver of the present invention, the need for a remote control unit can be completely eliminated, resulting in less stress for users who frequently have to find their misplaced remote control units.

DETAILED DESCRIPTION OF PREFERRED EMBODIMENTS

Figure 1:
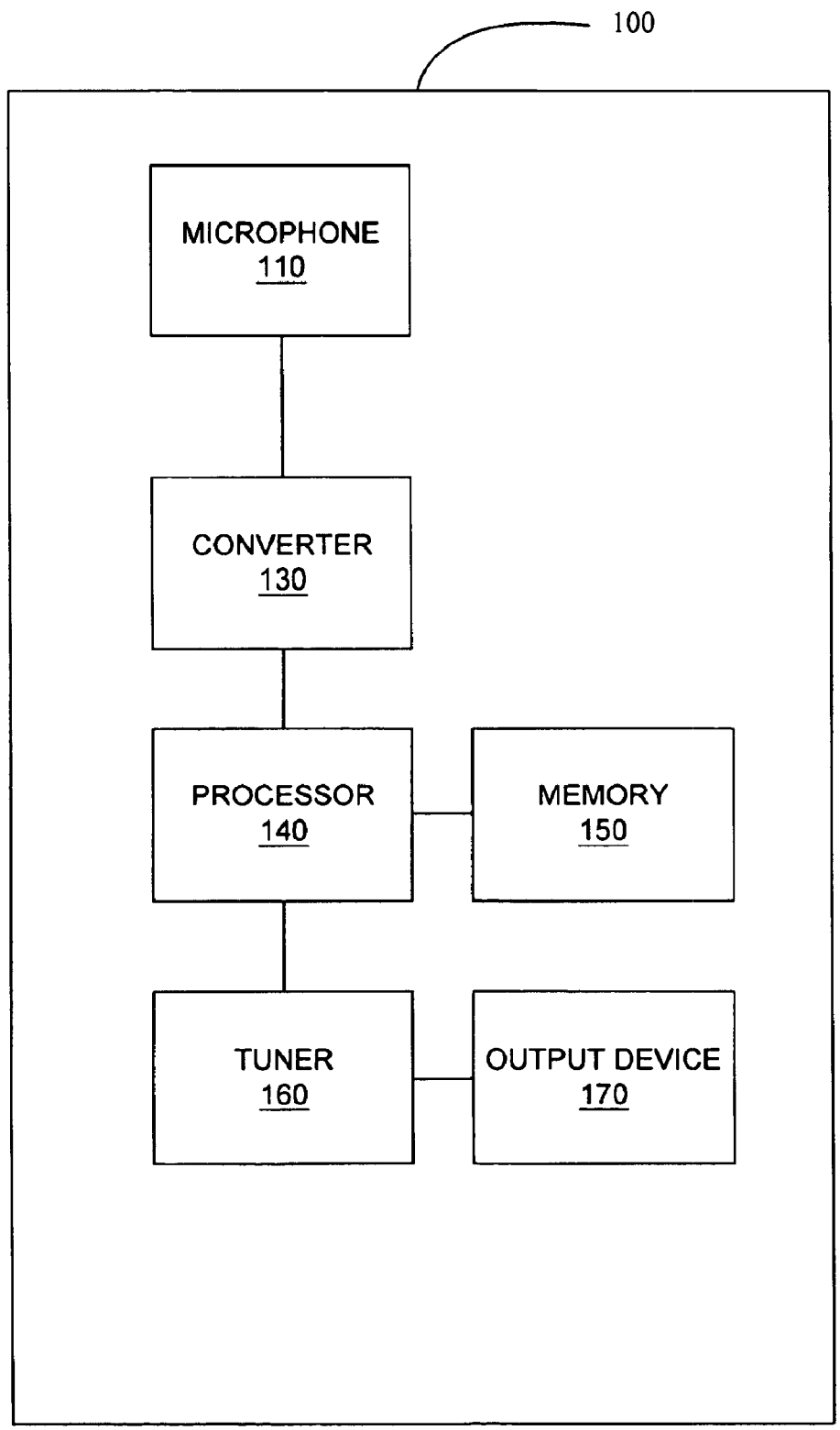
FIG. 1 is a schematic diagram showing the general architecture of an embodiment of the present invention.

FIG. 1 is a schematic diagram showing the general architecture of an embodiment of the present invention. Receiver 100 is a broadcast programming receiver of the present invention. Receiver 100 can be a radio, a television set, or a similar device that can be used to receive and reproduce broadcast programming. For discussion purposes, assume that receiver 100 is a radio installed in a vehicle.

Receiver 100 comprises microphone 110, converter 130, processor 140, memory 150, tuner 160, and output device 170. Output device 170 can be, for example, one or more speakers. Although it is depicted in FIG. 1 as an integrated unit, each component of receiver 100 can be separately installed within the vehicle. For example, microphone 110 may be installed on the hub of the steering wheel, or it can be integrated within the driver-side visor. Similarly, output device 170 can be installed at multiple locations within the cabin of the vehicle. In view of the prior art references that have been incorporated by reference above, it is noted that one skilled in the art can easily select the type of suitable microphone, converter, processor, memory, tuner, output device, and other components that are necessary to implement this embodiment of the present invention.

In this embodiment, receiver 100 functions as follows. First, when receiver 100 is powered on, it can automatically tune in to a default channel. The default channel may be the last tuned in channel before receiver 100 was previously powered off. The default channel may also be a specific channel that a user of receiver 100 has selected to be his or her favorite channel. Whenever receiver 100 is powered on, microphone 110 is on standby. Microphone 110 continuously captures speech segments spoken by all occupants (including the driver and passengers) of the vehicle.

When one occupant says, for example, "FM 107.9", microphone 110 captures the speech segment. Microphone 110 then transforms the speech segment into an analog signal. The analog signal is then provided to converter 130. Converter 130 subsequently converts the analog signal into a digital signal. When processor 140 receives the digital signal from converter 130, it makes a determination.

The determination made by processor 140 can involve one or more tasks that processor 140 is adapted to perform. For example, processor 140 can compare the digital signal that comprises the speech segment "FM 107.9" to one or more voice commands previously stored in memory 150. If the speech segment matches a voice command previously stored in memory 150, processor 140 instructs tuner 160 to tune in a channel that is associated with the voice command. For example, tuner 160 can tune to frequency 107.9 MHz on the frequency modulation ("FM") band. Finally, the programming being broadcast on FM 107.9 is reproduced by output device 170.

Figure 2:
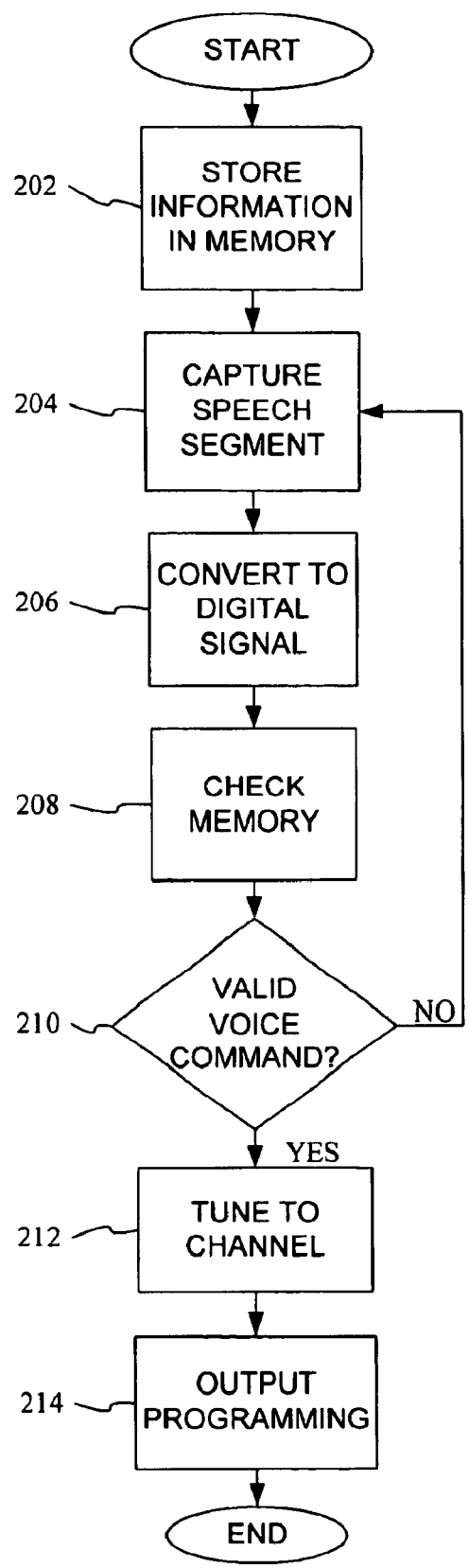
FIG. 2 is a flowchart illustrating general steps involved in using an embodiment of the present invention.

FIG. 2 is a flowchart illustrating general steps involved in using an embodiment of the present invention. In step 202, information is stored in memory 150. The information comprises relationships between voice commands and channels. The relationships could be associated by a manufacturer of receiver 100. The relationships may also be created by a user of receiver 100. Step 202 can be performed in accordance with known methods and technologies. For example, the teachings of the patents incorporated by reference may be used in step 202. Specifically, receiver 100 can be adapted to have a training mode that is disclosed in the Chuang patent.

Specific relationships or association between voice commands and channels created in step 202 can include, for example, those shown in Table 1 below. Each channel in this embodiment is represented by a band and a frequency.

TABLE 1

| Voice Command | Band | Frequency |
|---|---|---|
| "WZZZ" | FM | 107.9 MHz |
| "WABC" | FM | 99.9 MHz |
| "WEXZ" | AM | 1300 KHz |
| "WQPM" | AM | 1620 KHz |

The specific voice commands, bands, and frequencies shown in Table 1 are for illustration purposes. The voice commands in the left column represent call letters of radio stations that broadcast on the bands and frequencies shown in the middle and right columns, respectively. For example, the channel that operates on frequency 107.9 MHz on the FM band is operated by a radio station having the call letter "WZZZ". Similarly, the station operating on the frequency of 1300 KHz on the amplitude modulation (AM) band is known as "WEXZ." In addition to using call letters as voice commands, other alternatives, including those shown in Table 2 below, can be used as voice commands.

TABLE 2

| Voice command | Channel |
|---|---|
| "Atlanta's Best Station" | WZZZ |
| "107.9" | WZZZ |
| "FM 107.9" | WZZZ |
| "Bob's favorite station" | WZZZ |

As shown in Table 2, the radio station operating on the FM band at frequency 107.9 MHz, namely, WZZZ, may be identified by a user using a number of different identifiers that may be used as voice commands to operate receiver 100. These voice commands may be speaker-dependent or speaker-independent. Speaker-dependent means that receiver 100 will tune in to one channel associated with a voice command that is spoken by a specific person. For example, "Atlanta's Best Station" and "Bob's favorite station" may be speaker-dependent voice commands. Speaker-independent means that a voice command spoken by any person can be used to operate receiver 100. Speaker-independent voice commands can include, for example, "107.9" and "FM 107.9". It is noted that each of Tables 1 and 2 can be expanded or otherwise modified so that a plurality of voice commands can be related to or associated with a plurality of channels.

In step 204, when a speech segment is spoken by a user, the speech segment is captured by microphone 110. Microphone 110 then transforms the speech segment into an analog signal. In step 206, converter 130 receives the analog signal and converts the analog signal to a digital signal. In step 208, processor 140 receives the digital signal and compares it to the voice commands previously stored in memory 150.

In step 210, if the digital signal (that comprises the captured speech segment) is recognized as a valid voice command (i.e., the speech segment spoken by the user is one that which has been stored as a voice command in memory 150), processor 140 instructs tuner 160 to tune in to the channel that has been associated with the voice command. For example, if one of the voice commands associated with WZZZ is received, tuner 160 will tune to frequency 107.9 MHz on the FM band. For instance, if a user says, "FM 107.9," output device 170 will, in step 212, reproduce the sounds broadcast by WZZZ at the frequency of 107.9 MHz on the FM band. In embodiments in which "FM 107.9" is a speaker-dependent voice command, only the user whose voice was used to create the voice command will be able to properly operate receiver 100. In embodiments in which "FM 107.9" is a speaker-independent voice command, the speaking of "FM 107.9" by any user will result in receiver 100 tuning in to the channel.

Figure 3:
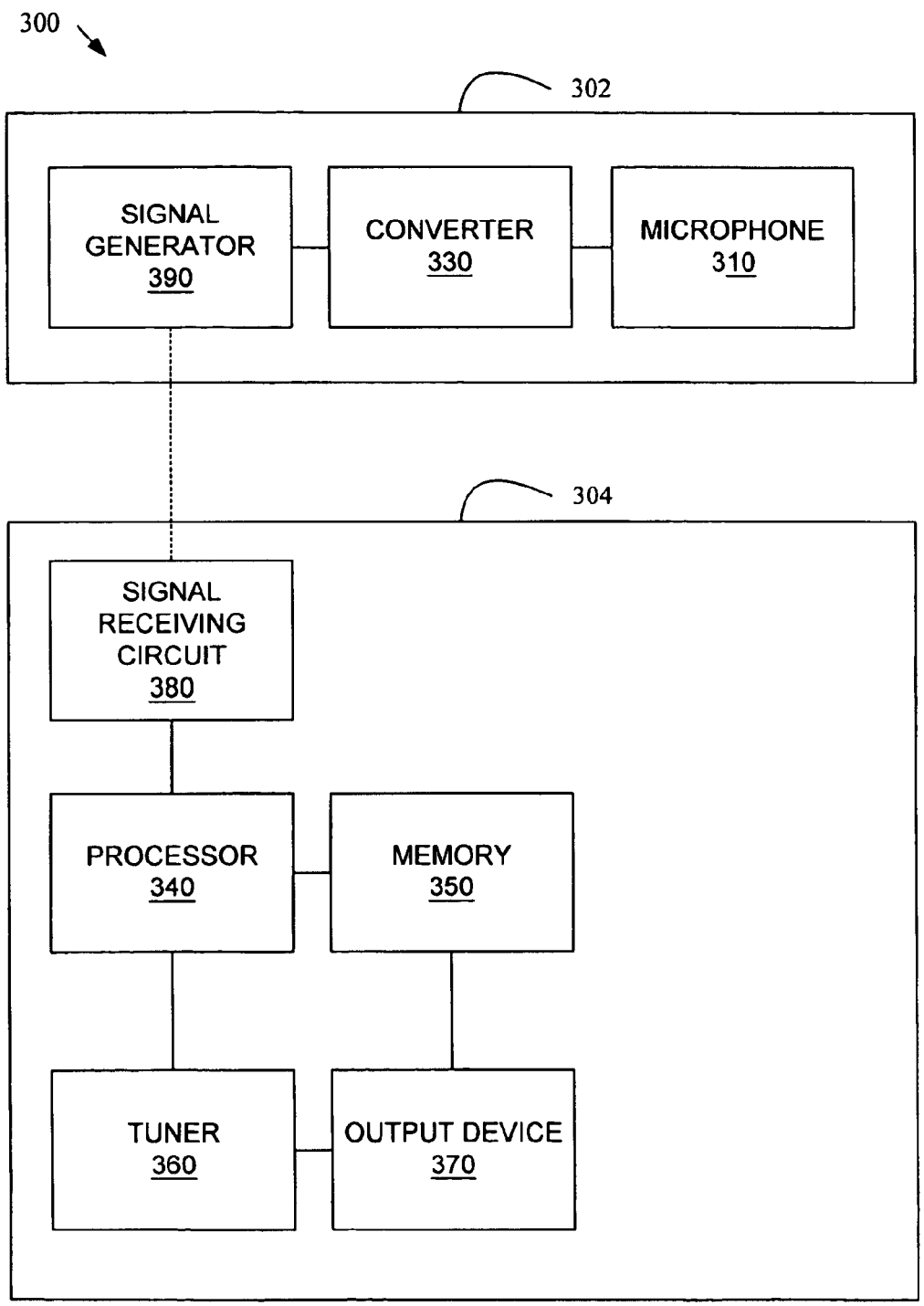
FIG. 3 is a schematic diagram showing the general architecture of another embodiment of the present invention, in which some components of the system are part of a remote control unit.

FIG. 3 is a schematic diagram showing the general architecture of another embodiment of the present invention, in which some components of the system are part of a remote control unit.

System 300 comprises remote control unit 302 and receiver unit 304. Remote control unit comprises microphone 310, converter 330, and signal generator 390. Receiver unit 304 comprises signal receiving circuit 380, processor 340, memory 350, tuner 360, and output device 370.

General characteristics of microphone 310, converter 330, processor 340, memory 350, tuner 360, and output device 370 are similar to corresponding microphone 110, converter 130, processor 140, memory 150, tuner 160, and output device 170, respectively, that are depicted in FIG. 1 and described above.

Signal generator 390 can be any known wireless signal generator. For example, signal generator 390 can be an RF signal generator or an infrared generator. Signal generator 390 receives the digital signal from converter 330 and transmits it over the air. Signal receiving circuit 380 receives the signal transmitted by signal generator 390. Like signal generator 390, signal receiver circuit 380 can be any known wireless signal receiver circuit. For example, signal receiver circuit 380 can be an RF signal receiver or an infrared receiver, depending on the type of signal transmitted by signal generator 390.

System 300 can be, for example, a television set. Output device 370 can comprise one or more speakers and a monitor.

Figure 4:
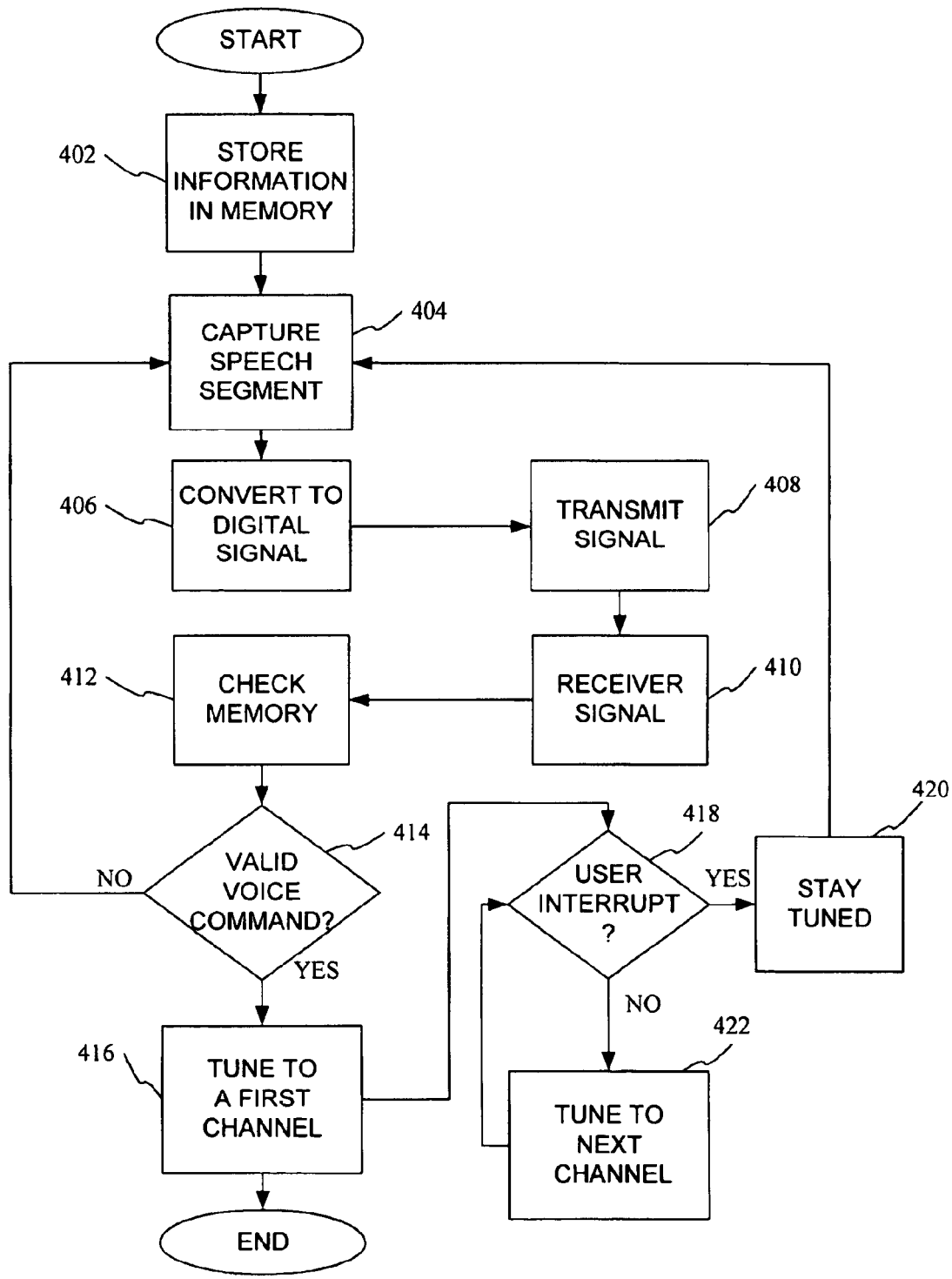
FIG. 4 is a flowchart illustrating general steps involved in using another embodiment of the present invention.

FIG. 4 is a flowchart illustrating the steps involved in using another embodiment of the present invention, in which a voice command is associated with a genre.

Step 402 through 406 are similar to corresponding steps 202 through 206 shown in FIG. 2 and described above. In addition to the Chuang patent, the teachings of other patents incorporated by reference above may be adapted to implement this embodiment and other embodiments of the present invention. Specifically, technologies disclosed in the Amano patent, the Williams patent, and the Ohkura patents may be adapted to enable one skill in the art to make and use the present invention.

The relationship created in step 402 may be, for example, those shown in Table 3 below.

TABLE 3

| Voice Command | Channel |
|---|---|
| "Sports" | 4, 12, 88 |
| "Music Video" | 89, 101 |
| "News" | 55, 66, 77 |
| "Comedy Channel" | 24 |

Each of the voice commands shown in the left column of Table 3 is associated with one or more channels. A voice command in the left column can represent a specific channel, for example, "Comedy Channel" is a voice command that is associated exclusively with Channel 24. A voice command in the left column may also represent a genre, for example, each of Channels 4, 12, and 88 is associated with a genre called "Sports". For discussion purposes, assume that "Sports" is a speech segment spoken by a user.

In step 408, signal generator 390 transmits the digital signal received from converter 330 over the air. In step 410, signal receiving circuit 380 receives the transmitted signal from signal generator 390.

Steps 412 and 414 are similar to steps 208 and 210, respectively, that are shown in FIG. 2 and described above.

In step 416, tuner 360 tunes in to a first channel of the genre identified in step 414. For example, if the speech segment received in step 404 was "Sports", then the first channel can be one of Channels 4, 12, 88. Output device 370 then reproduces the sound and images being broadcast by the first channel.

In step 418, system 300 monitors whether the user interrupts. If the user interrupts, the process goes to step 420. Otherwise, the process goes to step 422. The user can interrupt, for example, by pressing an appropriate button on remote control unit 302 or by speaking a subsequent speech segment. The subsequent speech segment may comprise, for example, "Stop", "I like this", "News", "Music Video", etc., provided that the subsequent speech segment has been previously stored in memory 350 as a voice command.

In step 420, tuner 360 stays tuned to the first channel and the process returns to step 404.

In step 422, tuner 360 tunes to another channel of the genre. Steps 422 and 418 repeat unless the user interrupts in step 418 with a valid voice command. The duration spent on one channel can be set to, for example, between about one second and about 30 seconds or other duration. The order in which the channels of the genre are tuned in to can be predetermined. For example, in the case of the "Sports" genre, Channels 4, 12, and 88 can be tuned in to in step 422 in one of several orders, including "4-12-88-4", "4-88-12-4", and the like.

Figure 5:
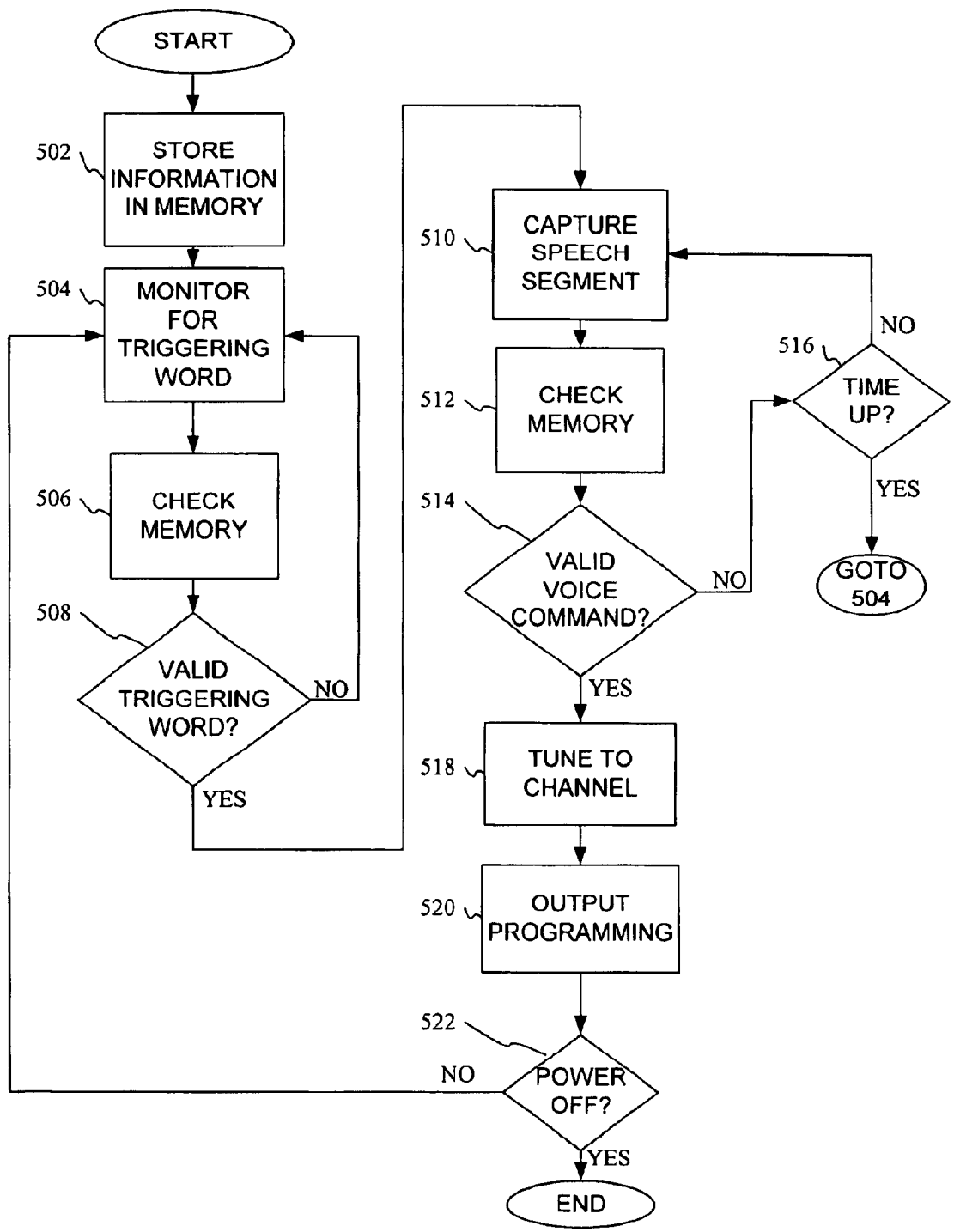
FIG. 5 is a flowchart illustrating general steps involved in using another embodiment of the present invention, in which a triggering word or phrase is required before a receiver monitors for a voice command.

FIG. 5 is a flowchart illustrating general steps involved in using another embodiment of the present invention, in which a triggering word or phrase from a user is required before a receiver begins to take voice command.

In step 502, information is stored in a memory of a receiver as described above in step 202. However, the information stored in step 502 further comprises one or more triggering words or phrases. A user must speak one of the triggering words or phrases before the receiver can implement or execute any valid voice commands. Examples of the triggering words and phrases can include "Activate Voice Command" or other words or phrases. The use of the triggering words and phrases can eliminate accidental change of channels due to spoken voice commands that are not intended as voice commands. For example, a user may say "FM 107.9" to another person during a conversation, but not intended to tune to the station associated with "FM 107.9".

In steps 504–508, the receiver, through the interactions of its components including a microphone, a processor, and the memory, monitors for the triggering word. As a user or users speak, the process involved in steps 504–508 repeats itself unless a valid triggering word or phrase is detected in step 508. During the steps 504–508 cycle, a speech segment that would have otherwise been interpreted as a valid command in step 514, would not be recognized by the receiver.

When a triggering word or phrase is detected in step 508, the process goes to step 510. In step 510, the system begins to monitor for voice commands by capturing speech segments. The process continuously repeats steps 510 through 514 until a valid voice command is detected. Preferably, the steps 510–514 cycle can be adapted to last for a specific duration. For example, the duration may be between about one and about ten seconds. In such preferred embodiment, if no valid voice command is detected during the duration specified in step 516, the process can be adapted to return to step 504.

If a valid voice command is detected in step 514, the process goes to step 518. In step 518, a tuner of the receiver tunes in to a channel that is associated with the voice command. In step 520, an output device of the receiver outputs the programs of the channel. Unless the receiver is powered off in step 522, the process returns to step 504, in which the receiver monitors for another triggering word or phrase before any voice command will be acceptable.

In describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

We claim:

1. A broadcast programming receiver comprising:
   a microphone for capturing a speech segment from a user of the receiver and generating an analog signal representative of the speech segment;
   a converter for converting the analog signal into a digital signal representative of the speech segment;
   a processor for interpreting the digital signal and determining whether the speech segment comprises a voice command associated with a genre comprising a plurality of channels;
   a tuner for tuning in to at least one channel associated with the voice command wherein the tuner tunes in to a first channel of the genre for a duration before tuning in to a second channel of the genre; and
   an output device for reproducing programming broadcast on the channel.

2. The receiver of claim 1, further comprising a memory in communication with the processor, wherein the memory comprises an association of the voice command and the channel.

3. The receiver of claim 1, wherein the voice command is exclusively associated with the plurality of channels.

4. The receiver of claim 1, wherein the channel is associated with the voice command and at least one other voice command.

5. The receiver of claim 1, wherein the voice command comprises one or more words.

6. The receiver of claim 1, wherein the voice command comprises a voice of the user.

7. The receiver of claim 1, wherein the duration is between about one second and about 30 seconds.

8. The receiver of claim 1, wherein the receiver is one of a radio, a television, and a video cassette player.

9. A method for operating a broadcast programming receiver comprising the steps of:

associating a plurality of voice commands with a plurality of channels wherein a voice command of the plurality of voice commands is associated with a genre comprising one or more channels of the plurality of channels;

storing a result of the associating step in a memory of the receiver;

capturing a speech segment from a user using a microphone of the receiver;

determining whether the speech segment matches one of the plurality of voice commands using a processor of the receiver; tuning in to one or more of the plurality of channels that are associated with the speech segment using a tuner of the receiver; and tuning in to each of the one or more channels associated with the genre for a duration.

10. The method of claim 9, wherein a second voice command of the plurality of voice commands is exclusively associated with one channel of the plurality of channels.

11. The method of claim 9, wherein a channel of the plurality of channels is associated with two or more voice commands of the plurality of voice commands.

12. The method of claim 9, wherein a voice command of the plurality of voice command comprises one or more words.

13. The method of claim 9, wherein the duration is between about one second and about 30 seconds.

14. The method of claim 9, further comprising the step of capturing a second speech segment from the user.

15. The method of claim 14, further comprising the step of tuning in to a specific channel associated with the genre if the second speech segment is recognized by the processor as a voice command of the plurality of voice commands.

16. The method of claim 9, wherein the receiver is one of a radio, a television, and a video cassette player.

17. A method for operating a broadcast programming receiver comprising the steps of:

associating a plurality of voice commands with a plurality of channels, wherein the plurality of the voice commands are created using a voice of a user and wherein a voice command of the plurality of voice commands is associated with a genre comprising one or more channels of the plurality of channels;

storing a result of the associating step in a memory of the receiver;

capturing a speech segment using a microphone of the receiver;

determining whether the speech segment matches one of the plurality of voice commands; tuning in to one or more of the plurality of channels that are associated with the speech segment using a tuner of the receiver if the speech segment matches one of the plurality of voice commands; and tuning in to each of the one or more channels associated with the genre for a duration.

18. The method of claim 17, wherein a second voice command of the plurality of voice commands is exclusively associated with one channel of the plurality of channels.

19. The method of claim 17, further comprising the step of capturing a second speech segment using the microphone and the step of turning in to a different channel of the plurality of channels if the second speech segment is determined by the processor to be a voice command of the plurality of voice commands.

20. A broadcast programming receiver comprising:

a microphone for capturing a speech segment from a user of the receiver and generating an analog signal representative of the speech segment;

a converter for converting the analog signal into a digital signal representative of the speech segment;

a processor for interpreting the digital signal and determining whether the speech segment comprises a voice command associated with a genre comprising a plurality of channels;

a tuner for tuning in to at least one channel associated with the voice command wherein the tuner tunes in to a first channel of the genre for a duration between about one second and about 30 seconds before tuning in to a second channel of the genre; and an output device for reproducing programming broadcast on the channel.

21. A method for operating a broadcast programming receiver comprising the steps of:

Associating a plurality of voice commands with a plurality of channels wherein a voice command of the plurality of voice commands is associated with a genre comprising one or more channels of the plurality of channels;

storing a result of the associating step in a memory of the receiver, capturing a speech segment from a user using a microphone of the receiver;

determining whether the speech segment matches one of the plurality of voice commands using a processor of the receiver; and tuning in to one or more of the plurality of channels that are associated with the speech segment using a tuner of the receiver; and tuning in to each of the one or more channels associated with the genre for a duration between about one second and about 30 seconds.

* * * * *

UNITED STATES PATENT AND TRADEMARK OFFICE
CERTIFICATE OF CORRECTION

PATENT NO.    : 6,876,970 B1
DATED         : April 5, 2005
INVENTOR(S)   : Silver et al.

It is certified that error appears in the above-identified patent and that said Letters Patent is hereby corrected as shown below:

Title page,
Item [*] Notice, "703" should read -- 706 --

Column 2,
Line 3, please add -- [sic] -- after "frequency"

Column 3,
Line 9, "tuning" should read -- tune --

Column 6,
Line 50, "skill" should read -- skilled --

Column 9,
Line 23, new paragraph after "the receiver"
Line 25, new paragraph after "the receiver; and"
Line 35, "command" should read -- commands --

Column 10,
Line 2, new paragraph after "of voice commands"
Line 38, "Associating" should read -- associating --

Signed and Sealed this

Second Day of August, 2005

JON W. DUDAS
*Director of the United States Patent and Trademark Office*